April 28, 1931. V. A. TRIER 1,802,685
PRESSURE GAUGE FOR INFLATED BODIES
Filed Jan. 4, 1929
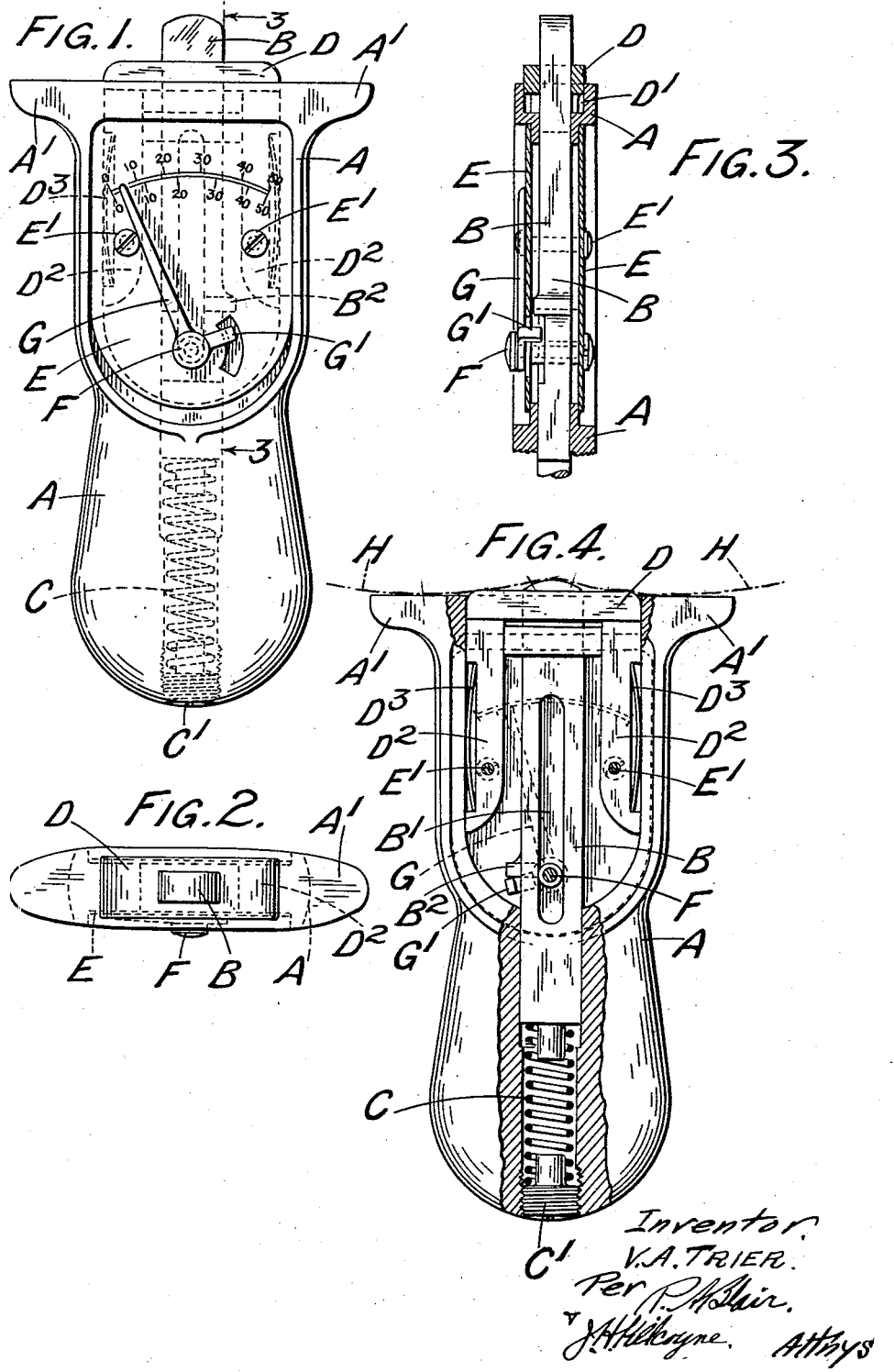

Patented Apr. 28, 1931

1,802,685

UNITED STATES PATENT OFFICE

VERNON ANTHONY TRIER, OF LONDON, ENGLAND

PRESSURE GAUGE FOR INFLATED BODIES

Application filed January 4, 1929, Serial No. 330,258, and in Great Britain February 15, 1928.

This invention relates to pressure gauges for pneumatic tyres or other elastic articles and in particular to gauges of the kind comprising a casing containing a spring-controlled plunger having an abutment adjacent thereto which comes into contact with that portion of the tyre which is not indented by the plunger when the whole device is pressed against the tyre to secure a reading by means of a pointer or the like.

Pressure gauges of the above type as hitherto made are open to the disadvantage that if carelessly used so that abutment is pressed into the tyre after it has made contact therewith, a false reading is obtained and it is the object of this invention to provide a device of the above general type of simple construction which will invariably give a correct reading without any skill on the part of the operator.

According to this invention the device comprises a casing containing a spring-controlled plunger, a movable indicating member actuated by the plunger, an abutment surrounding or adjacent to the plunger and means to prevent further movement of the indicating member when the abutment makes contact with that part of the tyre or other elastic body which is not actually depressed by the plunger. Thus in the event of the wall of the tyre being depressed by contact with the abutment owing to unskilful use of the device, to further movement of the indicator will occur and the correct reading will be given.

The particular way in which the desired result can be obtained will, of course, vary within wide limits in accordance with the construction and design of the pressure gauge and indicating device, but in a convenient arrangement where a pointer operatively connected to the plunger moves over a scale, both the scale and the pivot of the pointer are connected to the abutment and mounted to slide as a unit so that directly the abutment makes contact with the wall of the tyre further pressure thereon moves the scale and pointer temporarily out of operative connection with the plunger thus preventing any further movement of the pointer. Alternatively a portion of the abutment may project which, on making contact with the tyre, will prevent further movement of that member which indicates the pressure within the tyre. For example, the pointer may remain stationary and the scale may be the movable member and the desired reading may be given by a relative longitudinal movement between the scale and pointer, or by rotation between those or similar parts.

When, as is usually the case, the plunger is controlled by one or more adjustable springs, these springs may be employed to return the abutment or the movable portion thereof to its initial position as well as to restore the plunger to its inoperative position after the pressure has been released.

One construction of gauge according to this invention is illustrated by way of example in the accompanying drawings, in which Figure 1 is an elevation, showing some of the moving parts in dotted lines,

Figure 2 is a plan,

Figure 3 is a cross-section on the line 3—3 of Figure 1, and,

Figure 4 is a reverse view of Figure 1 (the cover plate being removed) and showing the gauge applied to the wall of a tyre.

Referring to the drawings the gauge comprises a casing A having shoulders $A^1$ and containing a plunger B mounted to move within the casing A against the action of a coiled spring C the effective strength of which can be adjusted by means of a grub screw $C^1$ in the base of the casing A. Surrounding the plunger B is an abutment D mounted in the casing so as to slide relatively thereto within a recess $D^1$ in the same direction as the plunger B. The abutment D is provided with two internally projecting arms $D^2$ to which are secured by means of screws $E^1$ two plates E one on each side of the casing A. One of the plates E has a scale delineated upon it and the plates support between them a pin F on which the pointer G is pivotally mounted so as to move over the scale. The arms $D^2$ are each held in alignment within the casing A by means of leaf springs $D^3$. The pin F passes freely through a slot $B^1$ in the plunger B, the lower end of the slot being so positioned that when the plunger B is moved into its outermost or normal position (as shown in Figures 1 and 3) by the coiled springs C, the lower end of the slot $B^1$ engages the pin F and holds the abutment D also in its normal or outermost position. A separate spring to control the abutment D is thus rendered unnecessary.

The pointer G is turned about its pivot F by means of a lever $G^1$ on the pointer engaged by a projection $B^2$ on the plunger B so that when the device is pressed up against the tyre, first the plunger B is depressed, thereby moving the pointer G over the scale until the plunger has depressed the tyre to such an extent that the abutment D comes into contact with the wall H of the tyre, as shown clearly in Figure 4. Thereupon, if any further pressure is exerted against the device, instead of the abutment D compressing the tyre, this abutment yields and moves relatively to the casing A within the recess $D^1$, the arms $D^2$ thus causing the plates E and the pin F which they carry to move relatively to the casing and consequently to move the lever $G^1$ away from the projection $B^2$. The lever $G^1$ is thus disengaged from the projection $B^2$ and any further pressure on the device merely causes the shoulders $A^1$ of the frame A to depress the tyre without affecting the reading on the scale, since the relative position of the plunger and the member D remain unchanged.

It will be appreciated that various modifications may be introduced in the construction of the device without departing from the invention, and, for example, the scale need not necessarily move with the abutment so long as relative movement between the scale and the pointer is prevented as soon as the abutment makes contact with the wall of the tyre or other hollow body.

Further, although the invention is primarily intended for testing the pressure within tyres of vehicles, it can be used for other similar purposes.

What I claim as my invention and desire to secure by Letters Patent is:—

1. In a pressure gauge for inflated bodies, the combination of a casing, a spring-pressed plunger projecting from said casing and adapted to be pressed against the inflated body, an abutment adjacent to the plunger and mounted to slide within the casing relatively to the plunger, a pivot connected to the abutment, a pointer on said pivot, and means actuated by the plunger to turn the pointer upon its pivot only until the abutment and pivot slide as a unit with the plunger when the abutment makes contact with that part of the inflated body not actually depressed by the plunger.

2. In a pressure gauge for inflated bodies, the combination of a casing, a spring-controlled plunger projecting from said casing and adapted to be pressed against the inflated body, an abutment adjacent to the plunger and mounted to slide within the casing relatively to the plunger, a plate bearing a scale connected to the abutment, a pivot on the plate, a pointer on the pivot, and an operative connection between the pointer and the plunger whereby the pointer is moved over the scale by the plunger until the abutment, the plate and the pivot slide as a unit relatively to the plunger when the abutment makes contact with that part of the inflated body not actually depressed by the plunger.

3. In a pressure gauge for inflated bodies, the combination of a casing, a plunger projecting from said casing, an abutment adjacent to the plunger and mounted to slide within the casing relatively to the plunger, a pivot connected to the abutment, a pointer on said pivot, means actuated by the plunger to turn the pointer upon its pivot only until the abutment and the pivot slide as a unit with the plunger, and a spring resisting inward movement of the plunger and thereby tending to restore the abutment and the pointer carried thereby to its operative position.

In testimony whereof I have signed my name to this specification.

VERNON ANTHONY TRIER.